United States Patent
Cho

(10) Patent No.: US 9,371,244 B2
(45) Date of Patent: Jun. 21, 2016

(54) DESALINATION SYSTEM AND PROCESS

(71) Applicant: Young I. Cho, Cherry Hill, NJ (US)

(72) Inventor: Young I. Cho, Cherry Hill, NJ (US)

(73) Assignee: Drexel University, Philadelphia, PA (US)

(*) Notice: Subject to any disclaimer, the term of this patent is extended or adjusted under 35 U.S.C. 154(b) by 0 days.

(21) Appl. No.: 14/027,282

(22) Filed: Sep. 16, 2013

(65) Prior Publication Data
US 2014/0014563 A1 Jan. 16, 2014

Related U.S. Application Data

(63) Continuation of application No. 12/922,082, filed as application No. PCT/US2009/036982 on Mar. 12, 2009, now Pat. No. 8,562,839.

(60) Provisional application No. 61/036,322, filed on Mar. 13, 2008.

(51) Int. Cl.
| | | |
|---|---|---|
| *C02F 1/46* | (2006.01) | |
| *C02F 1/48* | (2006.01) | |
| *C02F 1/44* | (2006.01) | |
| *C02F 9/00* | (2006.01) | |
| *B01D 1/28* | (2006.01) | |

(Continued)

(52) U.S. Cl.
CPC .............. *C02F 9/00* (2013.01); *C02F 1/4602* (2013.01); *C02F 1/48* (2013.01); *B01D 1/28* (2013.01); *B01D 61/02* (2013.01); *B01D 61/04* (2013.01); *C02F 1/041* (2013.01); *C02F 1/441* (2013.01); *C02F 1/487* (2013.01); *C02F 5/08* (2013.01); *C02F 2103/08* (2013.01); *C02F 2201/4613* (2013.01); *C02F 2201/46125* (2013.01); *C02F 2201/483* (2013.01); *C02F 2303/22* (2013.01)

(58) Field of Classification Search
CPC ............ C02F 1/46; C02F 1/4602; C02F 1/48; C02F 1/487; C02F 1/041; C02F 1/441; C02F 9/00; C02F 2201/46; C02F 2201/46125; B01D 61/02; B01D 61/08; B01D 61/10; B01D 61/58; B01D 1/28
See application file for complete search history.

(56) References Cited

U.S. PATENT DOCUMENTS

| | | |
|---|---|---|
| 3,990,968 A | 11/1976 | Oesterle |
| 4,507,208 A | 3/1985 | Simon et al. |

(Continued)

FOREIGN PATENT DOCUMENTS

| | | |
|---|---|---|
| JP | 9323029 A | 12/1997 |
| WO | 2007147097 A2 | 12/2007 |
| WO | 2009048682 A2 | 4/2009 |

OTHER PUBLICATIONS

Comdel. "CX series high frequency RF power supplies," available at <http://www.comdel.com>, accessed Feb. 26, 2016.*

(Continued)

*Primary Examiner* — Katherine Zalasky
(74) *Attorney, Agent, or Firm* — Mendelsohn Dunleavy, P.C.

(57) ABSTRACT

The present invention pertains to an effective system and method for reducing or eliminating the formation of scale in desalination systems. The system utilizes at least one pair of electrodes in direct contact with a liquid to induce an oscillating electric field directly in a portion of the liquid or a liquid stream of the desalination system. The electric field is capable of inducing bulk precipitation of ions, minerals, salts, particulates, contaminants or a combination thereof from the liquid stream.

19 Claims, 7 Drawing Sheets

(51) Int. Cl.
    *B01D 61/02*    (2006.01)
    *B01D 61/04*    (2006.01)
    *C02F 1/04*     (2006.01)
    *C02F 5/08*     (2006.01)
    *C02F 103/08*   (2006.01)

(56) References Cited

U.S. PATENT DOCUMENTS

| | | |
|---|---|---|
| 4,755,305 A | 7/1988 | Fremont |
| 4,865,747 A | 9/1989 | Larson |
| 5,026,484 A | 6/1991 | Juvan |
| 5,055,165 A | 10/1991 | Riffe |
| 5,124,012 A | 6/1992 | Berleyev |
| 5,670,041 A | 9/1997 | Cho |
| 5,725,778 A | 3/1998 | Cho |
| 5,776,334 A | 7/1998 | Cho |
| 5,846,414 A | 12/1998 | Cho |
| 5,916,490 A | 6/1999 | Cho |
| 5,951,856 A | 9/1999 | Cho |
| 6,292,085 B1 | 9/2001 | Cho |
| 7,083,733 B2 | 8/2006 | Freydina |
| 7,244,360 B2 | 7/2007 | Cho |
| 7,306,725 B2 | 12/2007 | Bartl et al. |
| 7,419,603 B2 | 9/2008 | Cho |
| 2003/0029796 A1 | 2/2003 | Maekawa |
| 2003/0132095 A1 | 7/2003 | Kenet et al. |
| 2004/0238453 A1 | 12/2004 | Cho |
| 2007/0170060 A1 | 7/2007 | Bourcier et al. |
| 2010/0219136 A1 | 9/2010 | Campbell |

OTHER PUBLICATIONS

Comdel. "Dual frequency RF generators & power supplies," available at <http://www.comdel.com>, accessed Feb. 26, 2016.*
Comdel. "CLB series low frequency RF power supplies," available at <http://www.comdel.com>, accessed Feb. 26, 2016.*
International Search Report and Written Opinion, PCT/US2009/036982 (Oct. 19, 2009).
Alimi, Fathi et al. "Influence of Magnetic Field on Calcium Carbonate Precipitation," Desalination, 2007, pp. 163-168, 206, Elsevier.
Cho, Y.I. et al. "Electro-Flocculation Mechanism of Physical Water Treatment for the Mitigation of Mineral Fouling in Heat Exchangers," Experimental Heat Transfer, 2007, pp. 323-335, 20, Taylor & Francis.
Cho, Young I. et al. "Physical Water Treatment for the Mitigation of Mineral Fouling in Cooling-Tower Water Applications," ASHRAE, 2003, pp. 346-357.

* cited by examiner

DESALINATION SYSTEM AND PROCESS

FIELD OF THE INVENTION

This invention relates to the field of water treatment systems. More specifically, the invention pertains to novel desalination systems and desalination methods.

BACKGROUND OF THE INVENTION

Components of desalination systems often accumulate mineral deposits resulting from minerals present in the liquid being processed. For example, $Ca^{++}$ ions combine with $HCO_3^-$ ions to form $CaCO_3$ particles. Mineral deposits form in liquids in a variety of ways. Some mineral ions combine in the liquid stream and form particles that settle onto surfaces in the form of a soft loose sludge. This is sometimes called particulate fouling. In other instances, ions deposit out of solution at a heat transfer surface and form hard crystalline deposits or scaling that binds to the heat transfer surface. This latter phenomenon is often referred to as crystallization or precipitation fouling.

Scaling can create significant problems, particularly in heat exchangers and other desalination equipment where the treated liquid contacts hot surfaces. The solubility of mineral compounds in water, such as $CaCO_3$, decreases as the liquid increases in temperature. This is sometimes referred to as inverse solubility. As a result, when water enters a heat exchanger and increases in temperature, dissolved mineral ions in the water deposit out of solution at the heat transfer surface where the water is the hottest. The mineral ions often adhere directly to the heat transfer surface as they react with $HCO_3^-$ ions. In the case of calcium ions, the reaction may be expressed as:

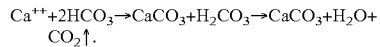

$$Ca^{++} + 2HCO_3^- \rightarrow CaCO_3 + H_2CO_3 \rightarrow CaCO_3 + H_2O + CO_2\uparrow.$$

Since the formation of $CaCO_3$ occurs on the heat transfer surface, the $CaCO_3$ particles frequently bind to the heat transfer surface to form scale. Excessive scaling can damage heat exchangers and reduce the rate of heat transfer through the heat transfer surface. In extreme cases, scaling can permanently damage the desalination equipment.

Mineral deposits in fluid conduits and equipment require periodic removal. Brush punching tools that have a coarse scrubbing surface are adequate to remove softer mineral deposits formed by particulate fouling. However, brush punching is not effective to remove scaling caused by crystallization fouling, and thus additional cleaning measures must be used. For example, chemical cleaning with acid solutions is often used in conjunction with brush punching to remove hardened scale from heat transfer surfaces. These techniques are time consuming and labor intensive, requiring the equipment to be shut down for significant periods of time.

In the present state of the art, physical water treatment (PWT) methods are used to reduce scaling in heat transfer equipment. These methods use a variety of mechanisms, including permanent magnets, solenoid-coils, pressure drop devices, and vortex flow devices. Although these methods employ different technologies, they are all used to promote bulk precipitation of mineral particles at locations other than at heat transfer surfaces. The precipitation reduces the dissolved concentration of mineral ions that enter the heat exchanger, reducing the potential for scale formation on the heat exchangers. In the case of calcium ions, PWT methods are typically designed to enhance the molecular attraction between $Ca^{++}$ and $HCO_3^-$ ions to cause precipitation of $CaCO_3$ particles at a desired location before the calcium ions can make contact with the heat transfer surface.

In PWT methods, the aim is to encourage the formation of soft sludge on the heat transfer surface through particulate fouling, and prevent hardened deposits at the heat transfer surface formed by crystallization fouling. Mineral ions are precipitated out of solution at locations other than at heat transfer surfaces to form seed particles in the bulk liquid. This reduces the concentration of dissolved mineral ions entering the heat exchanger, and thereby decreases the potential for mineral scaling on the heat transfer surfaces. As seed particles made of mineral ion precipitations enter the heat exchanger, they attract additional dissolved mineral ions that precipitate out of solution as the water temperature increases inside heat transfer equipment. The seed particles combine with the dissolved mineral ions to form relatively large particles that can be easily removed from the liquid stream. Particles that settle out of the liquid at a sump tank of a cooling tower and removed periodically via a drain hole at the sump tank. Alternatively, the particles form a soft sludge on the surface of heat exchanger tubes through particulate fouling. This sludge may be easily removed by punch brushing during a periodic maintenance program, or by scouring in areas having a higher water velocity.

In many prior art PWT methods an electrical field is employed to enhance the molecular attraction between $Ca^{++}$ ions and $HCO_3^-$ ions toward one another. One or more electrodes are placed on the exterior of a pipe or container that may be used to generate an indirect electrical field in the water. Note that the electrodes do not contact the liquid in the pipe or container Indirect electric fields, however, have limited effectiveness in reducing mineral scale, because they generally do not provide a strong enough electric field in the water to efficiently induce bulk precipitation. For example, it is known to surround a liquid carrying conduit with a solenoid coil driven by an alternating polarity in a square-wave current signal to induce a pulsating (reversing) electric field within the liquid. The electric field in the water is governed by Faraday s Law. According to Faraday s law, the electric field E is described by:

$$\int E \cdot ds = -\frac{\partial}{\partial t} \int B \cdot dA$$

where E is an induced electric field vector, s is a line vector in the electric field, B is a magnetic field strength vector, and A is the cross sectional area of the solenoid coil. In this arrangement, an induced electric field is produced within the water, but the field typically has limited electric field strength. When the solenoid is driven by a square-wave voltage signal having a voltage of 12 volts, 5 amperes peak, and a frequency of 500 Hz, the electric field strength is not more than about 5 mV/cm.

Under Faraday s law, the strength of the induced electric field depends on the solenoid coil diameter. The electric field strength induced in the water generally decreases as the diameter of the pipe increases. Therefore, to provide adequate field strength in larger pipes, larger solenoid coil diameters must be used, thereby increasing material and energy costs.

The strength of the induced electric field is also dependent on the frequency of the signal. Bulk precipitation of dissolved mineral ions generally becomes more efficient with higher frequencies (i.e. frequencies greater than 3,000 Hz). However, self-induction in the solenoid system increases with frequency under Faraday s Law, negating any benefit gained from the increased frequency. In practice, the frequency in the solenoid-coil system is limited to 500 to 3,000 Hz. Since it is not efficient to use high frequencies in large-diameter pipe applications (i.e., greater than 6 inches in diameter), solenoid-coil systems are not desirable.

From the foregoing, it is apparent that existing PWT methods that utilize indirect electrical fields for the reduction of mineral scaling leave something to be desired. There remains a need to develop an effective means for reducing the formation of mineral scale in desalination systems using electric fields.

SUMMARY OF THE INVENTION

The invention relates generally to desalination systems and methods for desalination. A desalination method for treating a liquid in accordance with the invention may include the steps of applying an alternating voltage to first and second electrodes in direct contact with the liquid to generate an oscillating electric field across a portion of the liquid, wherein the electric field has a strength and a frequency sufficient to form mineral particles; and subjecting the liquid stream to a further desalination step.

In another aspect, the invention relates to a method for reducing scale formation on an interior surface of a desalination system including the steps of applying an alternating voltage to first and second electrodes in direct contact with the liquid to generate an electrical field across a portion of the liquid, wherein the electric field has a strength and a frequency sufficient to form a plurality of seed mineral crystals; precipitating additional dissolved mineral crystals from the liquid; and removing the precipitated mineral crystals from the liquid.

In yet another aspect, the invention relates to a desalination system for treating a liquid including at least one pair of electrodes in direct contact with a liquid; a power source connected to the pair of electrodes that provides an alternating voltage to said pair of electrodes to thereby generate an oscillating electric field across a portion of the liquid; and a desalination device capable of substantially reducing the presence of one or more contaminants in said liquid selected from the group consisting of: ions, minerals, salts, particulates and combinations thereof.

DETAILED DESCRIPTION OF THE INVENTION

Figure 1:
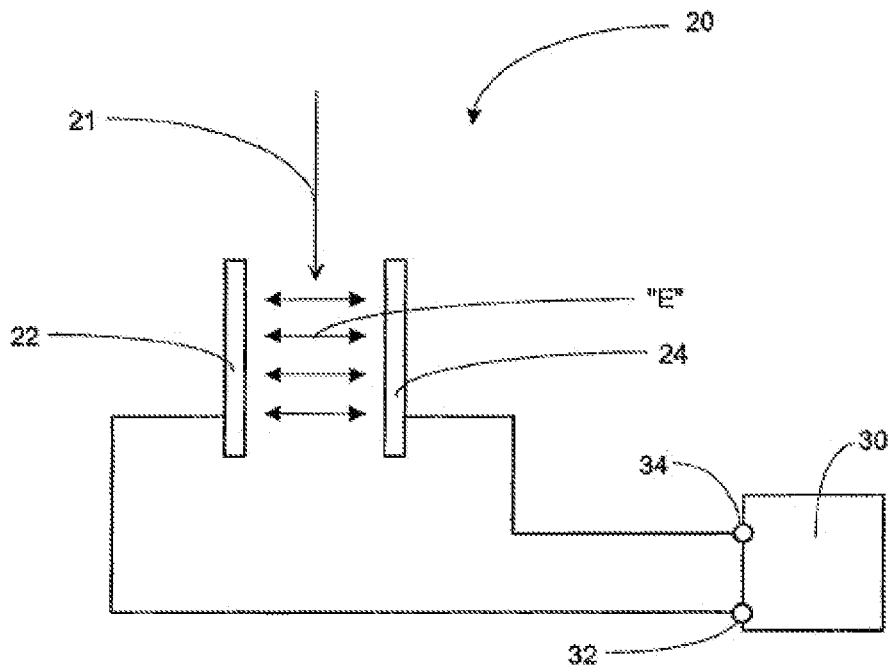
FIG. 1 is a schematic diagram of one embodiment of a liquid treatment apparatus in accordance with the present invention.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Thus, for example, reference to "a condenser" includes a plurality of condensers and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

For purposes of the present invention, "desalination system" and "desalination method" may refer to any system or method capable of removing or reducing the amount of ions, minerals, salts, particulates, contaminants or a combination thereof in a liquid. In general, desalination may refer to a process of reducing or eliminating the amount of scale produced or present in a system, a process of demineralization, a process of decontamination or a combination thereof. Moreover, for purposes of the present invention, the term liquid may be used to refer to any liquid, including but not limited to, water, well water, hard water, sea water, waste water, solutions that include ions, minerals, salts, particulates and/or contaminants or a combination there of. In an exemplary embodiment, the desalination system and method may be particularly effective on water, well water, hard water, waste water or a substantially water based solution.

The present invention pertains to a system and method for reducing or eliminating the formation of scale in desalination systems using an electric field. The desalination system 42 of the present invention incorporates an electric field inducing apparatus 20 that utilizes an alternating current to promote bulk precipitation of ions, minerals, salts, particulates, contaminants or combinations thereof. Apparatus 20 is compatible for use with a wide variety of desalination systems 42 and desalination methods 100 in FIG. 11 and may be used to treat any liquid which includes materials that may form scale.

Referring now to the drawings, apparatus 20 is generally shown in FIG. 1 and includes a first electrode 22 and a second electrode 24. First electrode 22 is connected by a wire to first terminal 32 on a power source 30, and second electrode 24 is connected by a wire to a second terminal 34 on power source 30. Electrodes 22, 24 are spaced apart, and a voltage difference is applied across electrodes 22, 24 to create an electric field between electrodes 22, 24.

Figure 2:
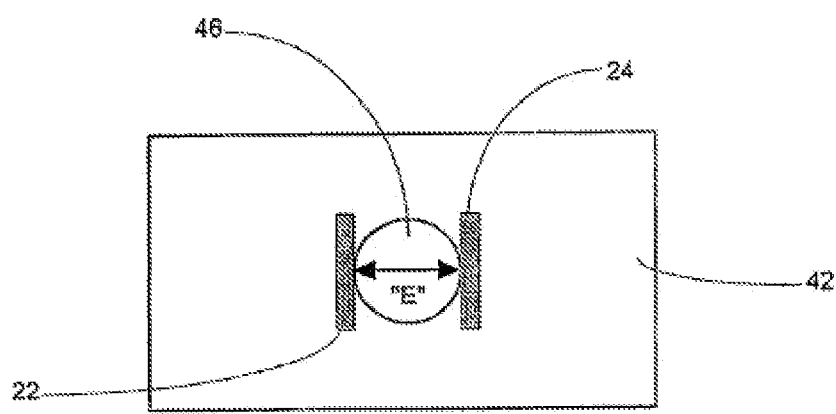
FIG. 2 is a schematic top plan view of an embodiment of a liquid treatment apparatus in accordance with the present invention.
Figure 3:
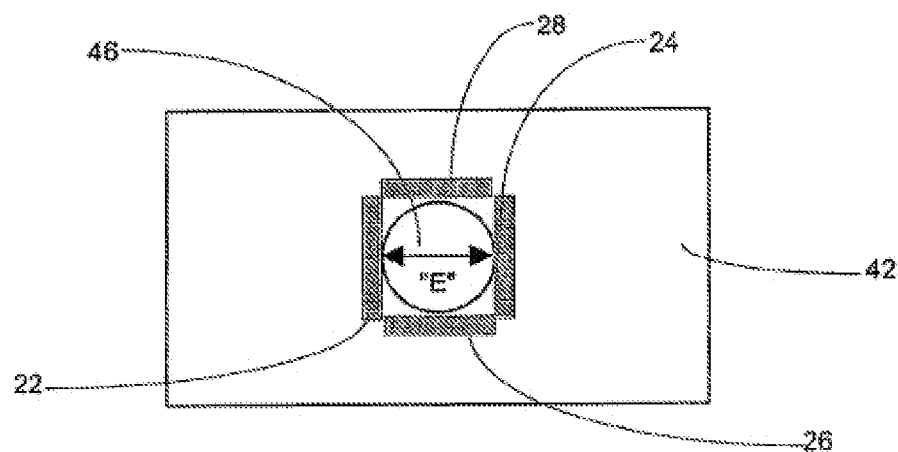
FIG. 3 is a schematic top plan view of another embodiment of a liquid treatment apparatus in accordance with the present invention.

One or more pairs of electrodes may be used to create an electric field across a liquid such as a liquid stream 21. Electrodes 22, 24 may be located at any location in desalination system 42. In one embodiment, a plurality of pairs of electrodes 22, 24 are located at different locations in desalination system 42. As shown in FIG. 1, electrodes 22, 24 may be positioned on opposite sides of liquid stream 21 such that liquid stream 21 flows between electrodes 22, 24 allowing creation of an electric field across liquid stream 21. Electrodes 22, 24 may also be positioned symmetrically about an outlet 46 of a conduit, such as a pipe, which conducts liquid stream 21. In FIG. 2, one pair of opposing electrodes 22, 24 is disposed adjacent to outlet 46. In FIG. 3, two pairs of electrodes 22, 24 and 26, 28 are disposed adjacent to outlet 46. Electrodes may be installed at any location in desalination system 42. For example, electrodes 22, 24 may be provided inside any conduit or component that leads to, forms a part of, or exits from desalination system 42 so long as electrodes 22, 24 contact the liquid in desalination system 42.

Figure 4:
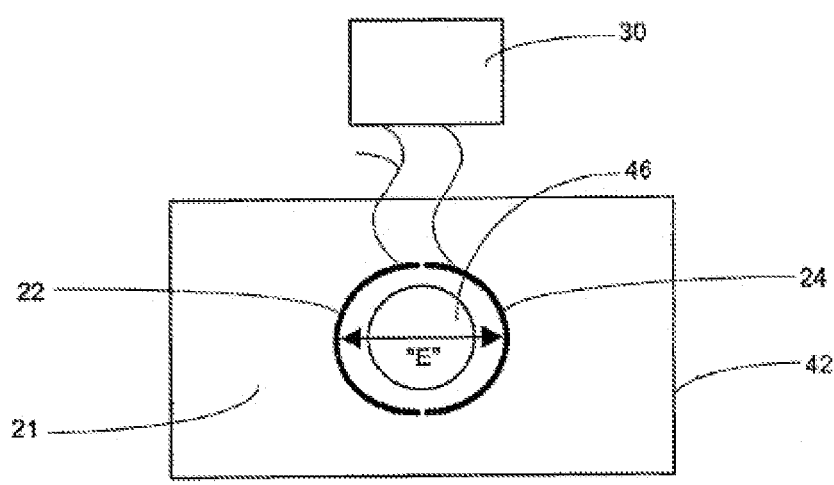
FIG. 4 is a schematic top plan view of a yet another embodiment of a liquid treatment apparatus in accordance with the present invention.

Electrodes 22, 24 may also have any suitable arrangement within desalination system 42 capable of generating an electric field across a portion of the liquid or across liquid stream 21. Regardless of the number and arrangement of electrodes used, electrodes 22, 24 are preferably securely fixed in desalination system 42. In an exemplary embodiment, electrodes 22, 24 may be stabilized by suspension rods, brackets or other suitable supports. Electrodes 22, 24 may also have any geometric shape or configuration suitable for generating an electric field across a portion of the liquid or across liquid stream 21. As shown in FIG. 4, electrodes 22, 24 may have a generally arcuate or semi-circular cross section. As shown in FIG. 2, electrodes 22, 24 may have a planar shape.

Electrodes 22, 24 may be formed of any suitable material. Preferably, electrodes 22, 24 are formed of graphite or other non-metal material. More preferably, electrodes 22, 24 may be fabricated from insulated material with a thin film coating of a highly conducting material on the surface to enhance their operation in direct contact with the liquid.

In contrast to other treatment techniques, electrodes 22, 24 used in the apparatus 20 are in direct contact with liquid stream 21, rather than affixed to the exterior of a pipe or vessel. As a result, the electric field is applied directly to liquid stream 21. In contrast to prior art PWT systems, the electric field properties are not subject to self-inductance under Faradays law; therefore, there is virtually no restriction on the frequency or current that can be used. Additionally, there is no restriction on pipe diameter. Consequently, electrodes 22, 24 can produce higher field strengths and operate at substantially higher frequencies to more efficiently precipitate mineral ions from liquid stream 21. For example, field strengths of 1 V/cm may be produced in a 6-inch diameter fluid conduit, which is 200 times greater than the field strength associated with conventional solenoid-coil systems. Since the electric field is not subject to self-induction, the frequency can be increased to 100,000 Hz or higher. Field strength may be increased up to 10 V/cm if desired. Moreover, the applied electric potential is safe to use because it can be as low as 12 V.

The electric field, represented by the double-ended arrows labeled E in FIGS. 1-4, is generated by a voltage applied by power source 30. The voltage may be applied as an alternating wave generated from an alternating power source. In some embodiments, pre-selected wave forms are employed. The voltage may have one of a variety of wave forms, such as a square wave, trapezoidal wave, or sinusoidal wave. The polarity of electrodes 22, 24 may be reversed or alternated at a controlled frequency to induce an oscillating electric field in liquid stream 21. Preferably, the polarity of electrodes 22, 24 may be reversed at a frequency between 500 Hz and 15 MHz. For example, a frequency greater than 1,000 Hz may be used for a 12V signal and an output current of between 5-10 amperes. In particular, frequencies of 13.56 MHz and 27.12 MHz allowed for industrial equipment can be used for the present invention.

Apparatus 20 of the present application may be used to treat any liquid and may be used in a wide variety of desalination applications, including demineralization, scale reduction or decontamination. Apparatus 20 may be particularly effective in desalination systems 42 for treating water, hard water, well water, sea water or wastewater. Apparatus 20 of the present invention is particularly useful in systems wherein the liquid is supersaturated with calcium and/or magnesium ions. As shown in FIGS. 5-8, apparatus 20 is compatible with reverse osmosis desalination, heat based desalination, vapor compression desalination and well water desalination systems. The present invention may also be used to treat a liquid stream in any application where it is desirable to control mineral scaling on heat transfer surfaces.

Figure 5:
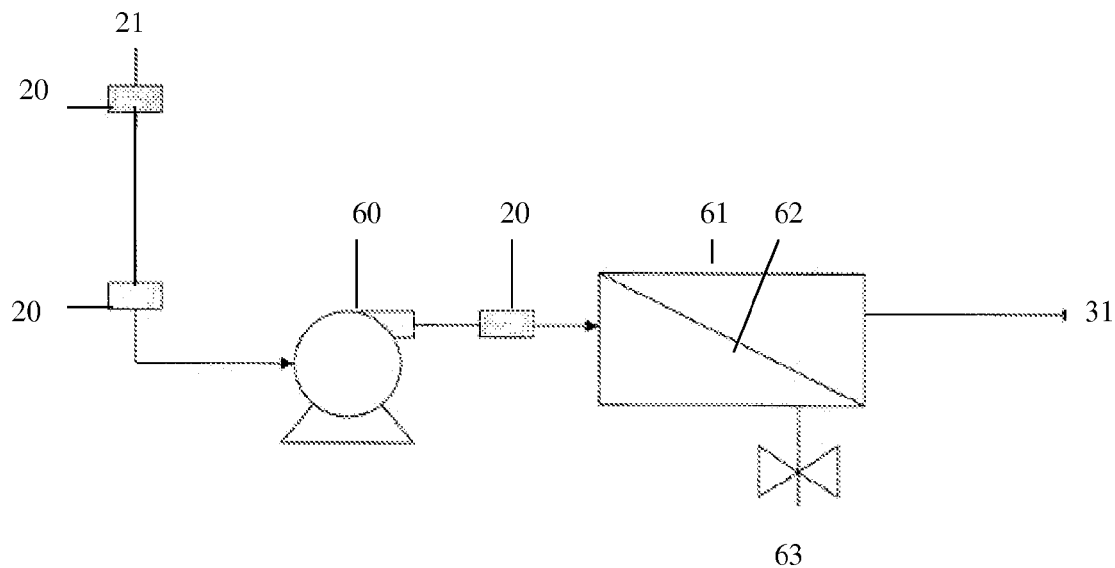
FIG. 5 is a schematic diagram illustrating a reverse osmosis desalination system that utilizes a liquid treatment apparatus.

FIG. 5 depicts a reverse osmosis desalination system using the electric field inducing apparatus 20 of the present invention. Generally, reverse osmosis systems include an incoming liquid stream 21 propelled by a pump 60 into a reverse osmosis chamber 61 having a reverse osmosis membrane assembly 62 for separating mineral laden liquids and mineral free liquids. As the liquid enters reverse osmosis chamber 61, it is filtered by membrane assembly 62. Minerals, salts and other particulates filtered from the incoming solution may be further filtered and/or removed from reverse osmosis chamber 61 using a mineral or brine discharge mechanism 63. The liquid 31 exiting reverse osmosis chamber 61 is substantially mineral free. Apparatus 20 of the present invention may be used to treat the incoming liquid stream 21 prior to the reverse osmosis chamber, within the reverse osmosis chamber, and/or after the liquid is circulated through reverse osmosis chamber 61. Preferably, as shown FIG. 5, apparatus 20 may be used to pretreat liquids prior to entering reverse osmosis chamber 61 and/or may be used as an initial liquid treatment or filtration step. Apparatus 20 may treat the incoming liquid stream 21 prior to, during, and/or after the liquid circulates through pump 60. Apparatus 20 may be located in one or a plurality of the locations in the desalination system, as shown in FIG. 5. Preferably, electrode water treatment apparatus 20 prevents or mitigates mineral fouling of reverse osmosis membrane 62, which is expensive and may be difficult to replace.

Figure 6:
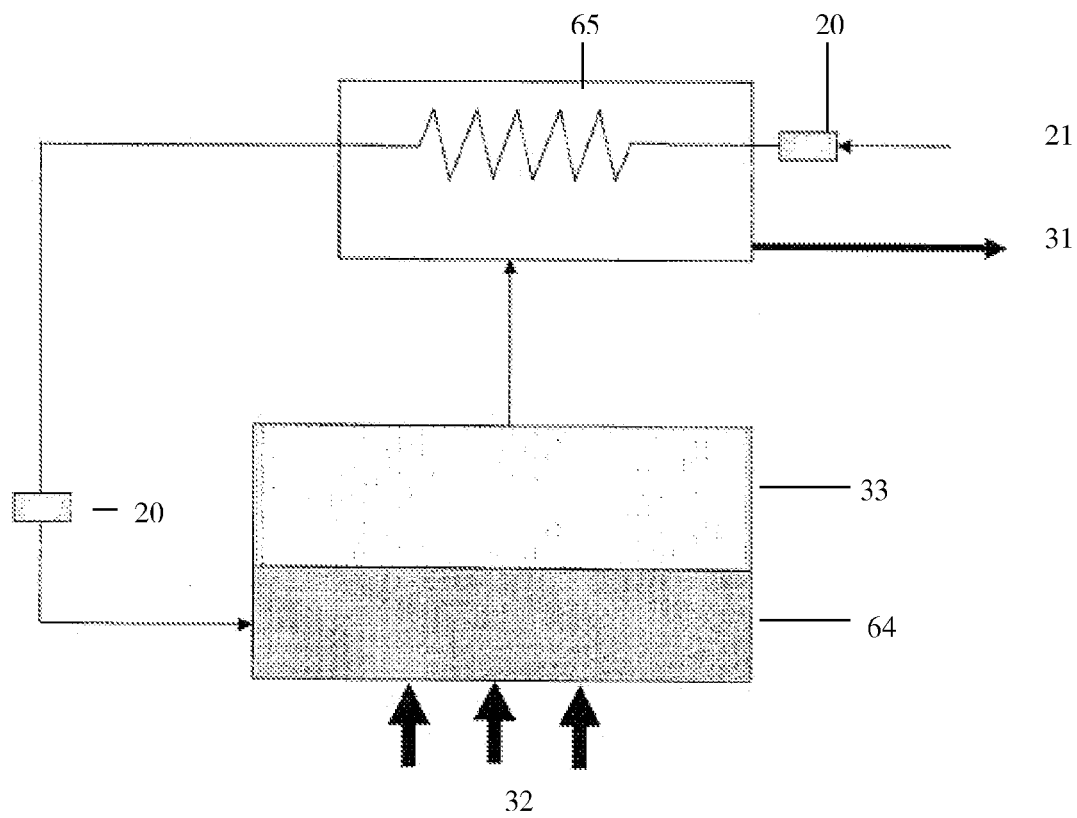
FIG. 6 is a schematic diagram illustrating a heat based desalination system that utilizes a liquid treatment apparatus.

FIG. 6 depicts another desalination system that utilizes heat. Heat based desalination methods generally involve a vapor generator 64 and a condensing unit 65. Liquid is heated in vapor generator 64 via a conventional heating means 32, such as steam, combustion or electricity, until steam and vapor 33 are released. In an exemplary embodiment, vapor generator 64 may be a boiler. The vapor 33 may then be transported to condensing unit 65 and subsequently used to heat a liquid stream 21 that is introduced into condensing unit 65. The heat of vapor 33 elevates the temperature of liquid stream 21 in condensing unit 65, which causes liquid stream 21 to demineralize and/or desalinate, producing a purified liquid stream 31.

This system may be particularly effective for treating sea water and waste water. Sea water contains significant amounts of calcium and magnesium ions, and waste water typically contains a wide variety of mineral contaminates. Since the solubility of mineral ions in waste water and sea water decreases with increasing temperature, these minerals consequently tend to precipitate when waste water and sea water are heated. Unfortunately, as these mineral ions precipitate, they tend to adhere to the hot heat transfer surfaces, such as condensing unit 65 and vapor generator 64. Therefore, apparatus 20 maybe used to prevent or mitigate the adhesion of these salts and other particulates to the heat transfer surfaces. Apparatus 20 may be located anywhere within the heat based desalination system. Preferably, as shown in FIG. 6, apparatus 20 may be used to treat liquid stream 21 at a plurality of locations within the desalination system. As shown in FIG. 6, apparatus 20 may be placed before the entrance of condensation unit 65, vapor generator 64 or a combination thereof.

Figure 7:
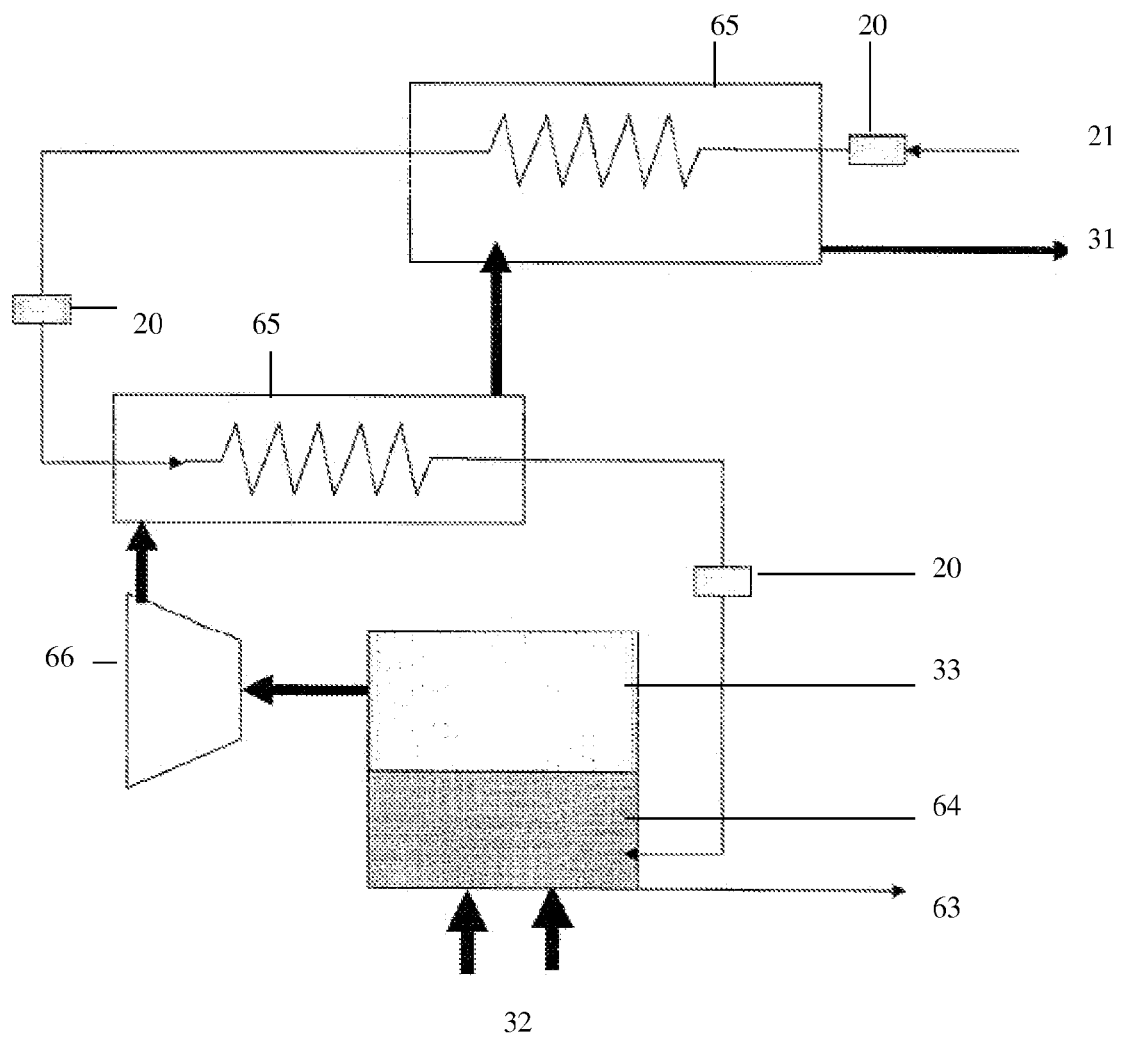
FIG. 7 is a schematic diagram illustrating a vapor compression desalination system that utilizes a liquid treatment apparatus.

FIG. 7 depicts a third desalination system that utilizes vapor compression. The system operates in a similar manner as the heat based desalination system of FIG. 6. Liquid is heated in vapor generator 64 via a conventional heating means 32 until steam and vapor 33 are released. Brine, mineralized or particulate saturated solution 63 may be subsequently discharged from vapor generator 64 after vapor 33 is produced. Vapor 33 may then be transported to a vapor compression unit 66, which increases vapor temperature. The elevated vapor temperature substantially enhances the energy efficiency of the system. Vapor 33 is fed into condensing unit 65 or, as shown in FIG. 7, a plurality of condensing units 65. The elevated temperature of vapor 33 from the compressor may be used to heat a liquid stream 21 introduced into condensing unit 65. The consequent heat causes liquid stream 21 to demineralize and/or desalinate, producing a purified liquid stream 31. For the same reasons discussed above in the heat based desalination system, the system of FIG. 7 may be particularly useful for treating sea water and waste water.

Figure 8:
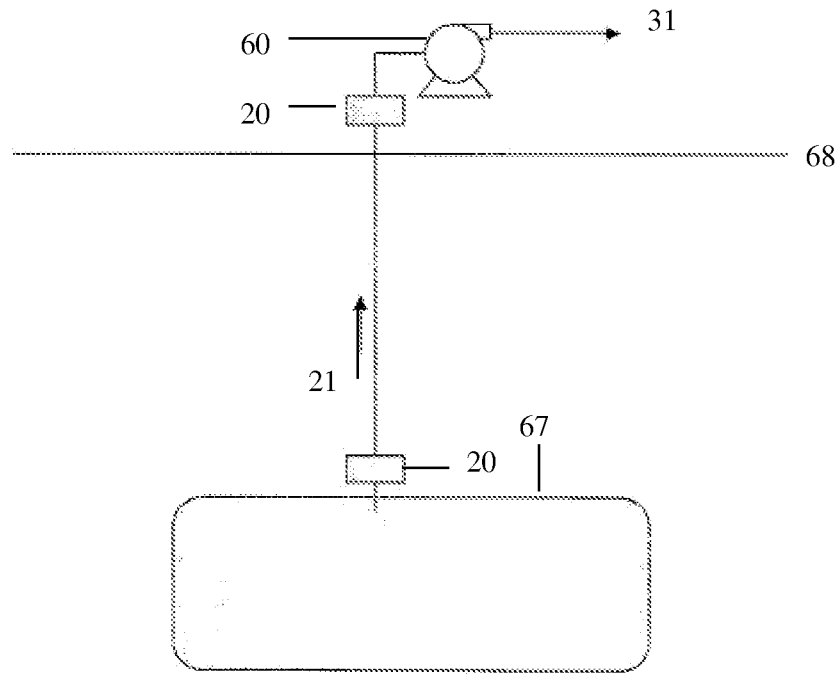
FIG. 8 is a schematic diagram illustrating a well water desalination system that utilizes a liquid treatment apparatus.

FIG. 8 shows a well water treatment system, where pressurized water in the well becomes de-pressurized as water rises to the ground level, inducing precipitation of dissolved mineral ions in the well water. Typically well water treatment systems includes a below ground reservoir 67 and a pump mechanism 60. When liquid stream 21 within reservoir 67 is pumped out to ground level 68, mineral ions precipitate as result of the decrease in pressure in liquid stream 31. As these mineral ions precipitate, they tend to adhere to the surface of the conduits between reservoir 67 and pump mechanism 60 as well as to various pump mechanism 60 components, such as the pump vanes. To prevent or minimize the adherence of these mineral ions, apparatus 20 may be incorporated at any location of the well water treatment system, preferably, at multiple locations within the system. In an exemplary embodiment, apparatus 20 maybe used to treat liquid stream 21 prior to the liquid reaching the pump 60, prior to reaching ground 68 or a combination thereof. As shown in FIG. 8, apparatus 20 may be installed underground and/or above ground. This system may be particularly useful for treating well water, hard water and sea water, which are characterized by being supersaturated in calcium and magnesium ions.

Figure 9:
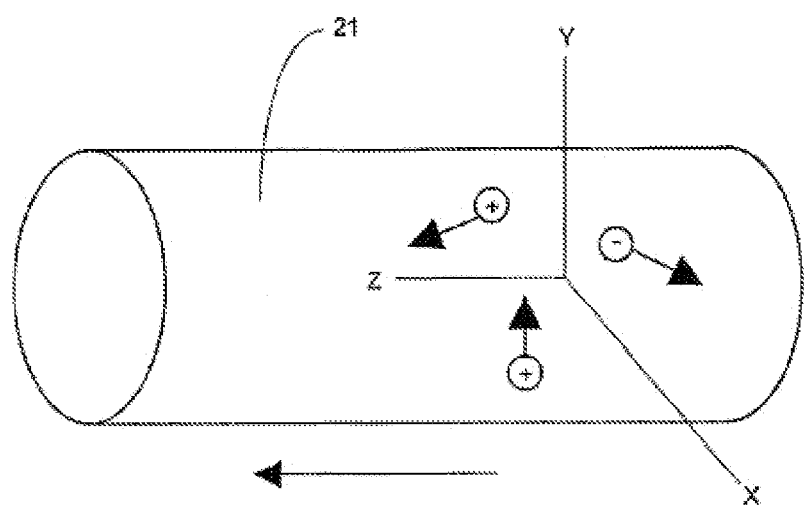
FIG. 9 is a schematic diagram illustrating the mobility of dissolved mineral ions in a liquid stream in the absence of an electric field.
Figure 10:
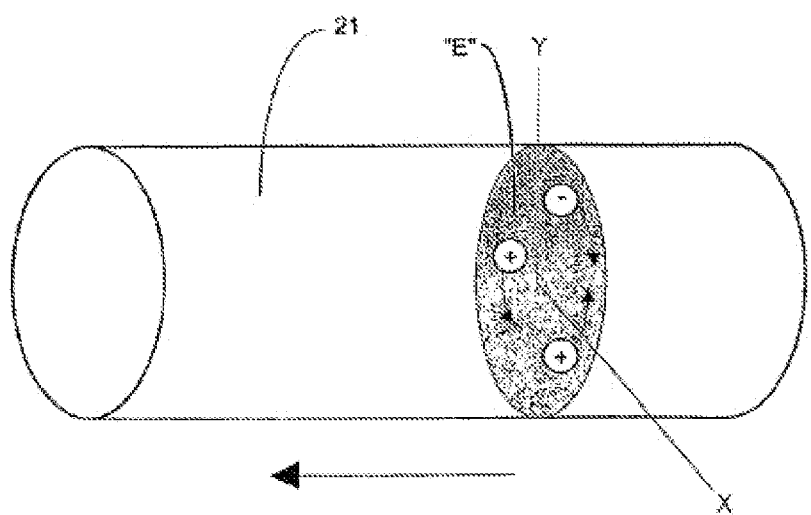
FIG. 10 is a schematic diagram illustrating the mobility of dissolved mineral ions in a liquid stream in the presence of an electric field.

Referring now to FIGS. 9-10, the effect of the electric field on mineral ions in liquid stream 21 will be described in more detail. In the absence of an electric field, mineral ions in liquid stream 21 have freedom of motion in a three-dimensional space. FIG. 9 illustrates the three-dimensional motion of mineral ions in a fluid conduit in the absence of an electric field. Positive and negative ions are free to move radially with respect to the conduit, i.e. in a two dimensional plane represented by the X and Y axes in FIG. 9. The ions are also free to move axially with respect to the conduit, i.e. in the direction of the Z axis in FIG. 9. With this freedom of motion, and the small size of the dissolved ions, the statistical probability of collision between ions and bulk precipitation of minerals is relatively small.

Now referring to FIG. 10, the motion of mineral ions in liquid stream 21 is illustrated in the presence of an electric field directed orthogonally to the flow direction. When the electric field E is applied to liquid stream 21, ions in the liquid are subject to the electromotive forces induced by the electric field. The orthogonal forces limit movement of the ions to a two dimensional plane relative to the stream, as shown by the shaded cross-sectional area in FIG. 10. The electric field moves positively charged ions in one direction and negatively charged ions in the opposite direction, so that positive and negative ions are driven toward one another. Since the electric field limits movement of the ions to a single plane, the electric field increases the statistical probability of collision between ions and bulk precipitation of minerals. As a result, the electric field promotes the collision of ions, such as $Ca^{++}$ and $HCO_3^-$, thereby causing the ions to combine and form mineral or seed particles through bulk precipitation.

As discussed earlier, bulk precipitation decreases the concentration of dissolved free ions in the liquid stream that enter heat exchangers, such as vapor generators 64, condensing units 65 or vapor compression units 66, thereby reducing the potential for scaling on heat transfer surfaces. Additionally, bulk precipitation decreases the concentration of free ions in the liquid stream that may enter a reverse osmosis chamber 61, reservoir 67 or other desalination system component, thereby reducing the potential for scaling on a reverse osmosis membrane 62, conduit or other desalination system surface. The seed particles that enter the heat exchanger, reverse osmosis chamber or other desalination system component attract mineral ions as the dissolved mineral ions precipitate from solution, further reducing the potential for scaling.

Electric power is supplied to electrodes 22, 24 from power source 30 to create a voltage difference across the electrodes. The polarity of the electrodes is alternated to form an oscillating electric field through liquid stream 21. As liquid stream 21 passes through the electric field, dissolved mineral ions are taken out of solution and form seed particles through bulk precipitation, as described earlier. The seed particles are suspended in liquid stream 21 as it passes through conduits and travels through desalination system 42.

As described in FIGS. 6-7, when liquid stream 21 contacts a heat transfer surface of a desalination system, it absorbs heat, and the temperature of liquid stream 21 rises, causing dissolved mineral ions to come out of solution. Alternatively, as shown in FIG. 5, when liquid stream 21 enters reverse osmosis chamber 61, dissolved mineral ions, salt and particulates are filtered by membrane assembly 62 and subsequently their concentrations significantly increase, causing the excess dissolved mineral ions to come out of solution. As shown in FIG. 8, dissolved mineral ions may also precipitate when a decrease in pressure of liquid stream 21 occurs as it is being pumped from a below ground reservoir. These precipitated seed particles formed from bulk precipitation attract other dissolved mineral ions in the liquid stream and progressively grow into larger particles. Liquid streams containing mineral particles are then discharged from desalination system 42. The mineral particles in liquid stream 21 gradually settle to the bottom of a collection reservoir located after the pump and form a soft sludge. Periodically, the sludge may be removed from the bottom of the reservoir through a drain or other suitable clean out method.

In some instances, mineral particles may settle in other areas of desalination system 42, such as various components or conduits. Since the settled mineral particles form a soft sludge, the sludge may be easily removed by shear forces created by the passing liquid stream. These mineral particles may also be removed by settling the particles in a collection reservoir, as described earlier. Alternatively, the mineral particles may be removed from desalination system 42 by a filter, which may be installed at any location within desalination system 42. As mineral particles attach to mineral ions that come out of solution, the particles can reach sizes on the order of 5-10 microns. As a result, the particles can be removed easily using any appropriate filter, such as a mechanical filter or sand filter. The specific gravity of these particles can be approximately three times heavier (i.e., specific gravity of $CaCO_3$ is 2.75) than water. Therefore, preferably, the particles are filtered by a cyclone filter, which is not prone to clogging or plugging by $CaCO_3$ and other mineral deposits that accumulate in the filter.

Thus far, the present invention has been described as it is used to reduce the occurrence of mineral scaling in a desalination system 42. The system and method of the present invention may also be used to prevent growth of bacteria, algae and other microorganisms present in a liquid stream. Uncontrolled growth of microorganisms, known as biofouling, can degrade the performance of and potentially damage the desalination equipment. Biofouling may be effectively eliminated by applying an oscillating electric field to the cooling water stream at a current and frequency adequate to kill the microorganisms. In many cases, this is the same operating current and frequency used to promote bulk precipitation of minerals, as described above. Microorganisms may also be destroyed by the action of submicron mineral particles, which are toxic to certain microorganisms. Electrodes may be placed along any conduit or at any location where microorganism growth is most likely to occur. Destroyed biological material can be removed from the cooling water using the same techniques for removing mineral particles.

Figure 11:
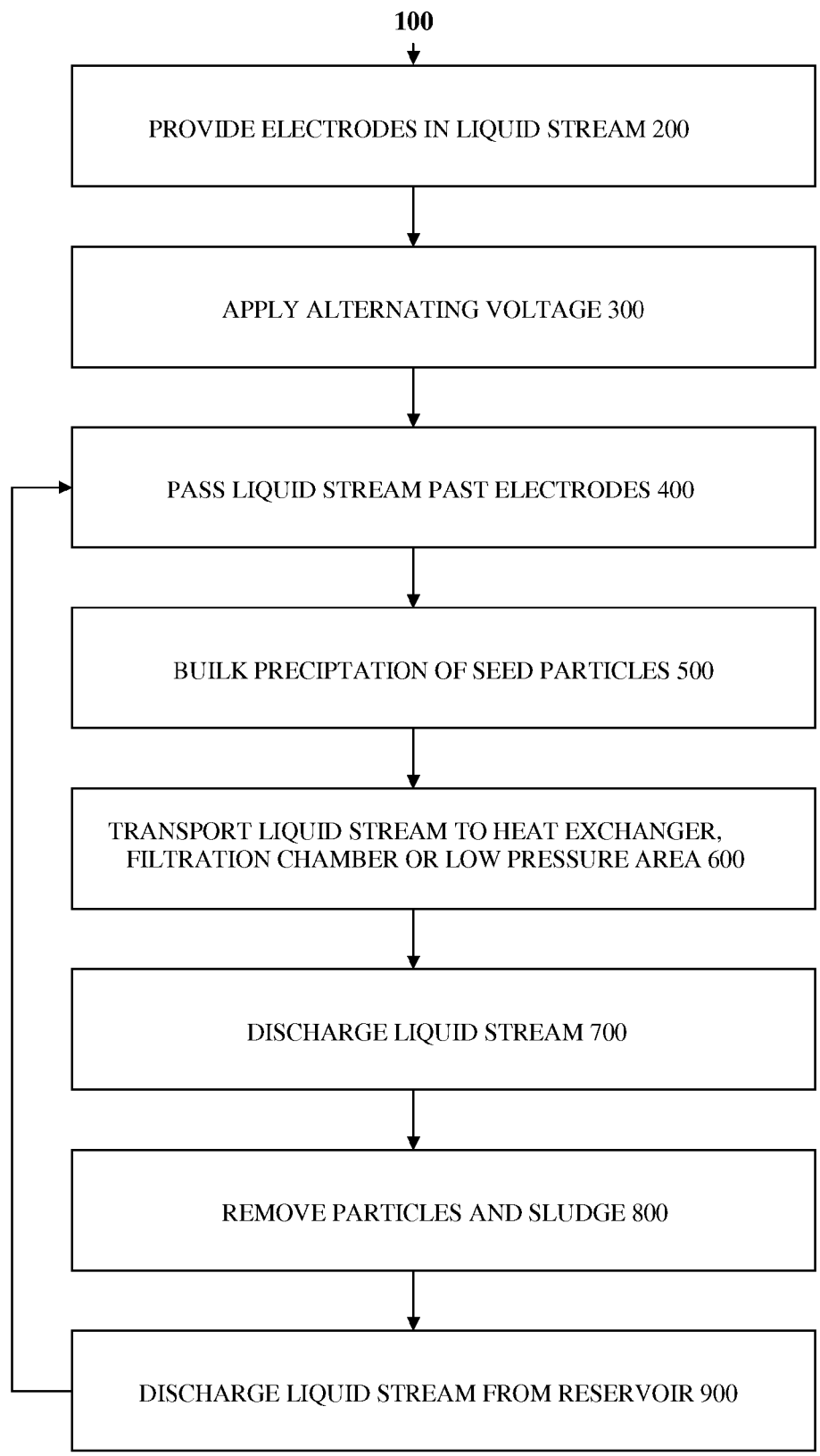
FIG. 11 is a flow diagram showing a desalination method for treating a liquid stream in accordance with the present invention.

Referring to FIG. 11, a block flow diagram illustrates an exemplary embodiment of a desalination method 100. The order in which the steps appear is not intended to represent the only possible sequence of steps, and other steps may be added or omitted without deviating from the scope of the method according to the invention.

In step 200, electrodes are provided in a liquid stream of a desalination system 42. In step 300, an alternating voltage is applied across the electrodes to produce an electric field in a portion of a liquid or across a liquid stream. The polarity of the voltage may be varied at a high frequency to produce an oscillating electrical field. In step 400, the liquid stream is conveyed through or past the electrodes. As the cooling water passes between the electrodes, the oscillating electrical field stimulates the collision of dissolved ions in the cooling water.

In step 500, the electrical field frequency is controlled to promote bulk precipitation of mineral ions out of solution. Efficiency of bulk precipitation increases as frequency is increased. The ions may be precipitated into seed particles that are suspended in the cooling water and carried through the system by the cooling water stream. In step 600, the liquid stream and seed particles are conveyed to a heat exchanger, a filtration chamber or to a location of lower pressure. As the liquid stream passes through the heat exchanger, filter chamber or low pressure area, dissolved mineral ions may precipitate out of the liquid and bind with the seed particles through intermolecular attraction, forming mineral particles.

In step 700, the liquid stream containing mineral particles may be discharged from the desalination system and conveyed to a reservoir. The large mineral particles may settle to the bottom of the reservoir and form a soft sludge. In step 800, the mineral particles and sludge are removed from the reservoir. Sludge may be removed through a drain or clean-out port at the bottom of the reservoir. Alternatively, or in addition, the liquid stream may be pumped through a side-stream filter line to remove mineral particles from the liquid stream, as described earlier. The filtered liquid stream may be returned to the reservoir. In step 900, the liquid stream may be subsequently discharged from the reservoir. The cooling water may then be recirculated through the desalination system, and steps 400-900 may be repeated.

It may also be desirable to use the foregoing desalination system 42 and method 100 with other treatment options to improve the quality of a liquid stream and reduce the accumulation of harmful deposits or reduce scaling. For example, the present method may include the step of adding a polymer solution to liquid stream 21. Long chain water-soluble compounds, such as polyethylene oxide (PEO) or polyacrylamide (PAM), may be added to liquid stream 21 with a high hardness, i.e. a high mineral content. These compounds help bridge calcium ions together in hard water. By bridging calcium ions, the availability of calcium ions in solution is reduced, decreasing the potential for scaling at heat transfer surfaces.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

The invention claimed is:

1. A desalination system for treating a liquid, comprising:
at least one pair of electrodes positions for direct contact with the liquid;
a power source connected to said electrodes configured to provide an alternating voltage to said electrodes that generates at least one oscillating electric field having a field strength sufficient to cause bulk precipitation of mineral particles in the liquid and said electrodes and said power source are configured to provide said oscillating electric field at a frequency of 13.56 to 27.12 MHz in at least a portion of the liquid; and
a desalination device that is configured to substantially reduce the presence of contaminants in the liquid that has been treated with said oscillating electric field, said contaminants being selected from the group consisting of: ions, minerals, salts, particulates or a combination thereof.

2. The system of claim 1, wherein said desalination device comprises a vapor generator and a condenser.

3. The system of claim 1, wherein the desalination device comprises a vapor compression unit.

4. The system of claim 1, wherein the desalination device comprises a reverse osmosis means.

5. The system of claim 2, wherein the desalination device further comprises a heater.

6. The system of claim 1, wherein the power source applies a voltage to the electrodes having a pre-selected wave form selected from the group consisting of a square wave, a trapezoidal wave and a sinusoidal wave.

7. The system of claim 1, further comprising a filter positioned such that the liquid that has been treated by said at least one said oscillating electric field must pass through the filter.

8. The system of claim 1, further comprising a device for adding at least one compound to the liquid prior to treatment of said liquid by said at least one oscillating electric field.

9. The system of claim 1, wherein the oscillating electric field has a magnitude and a frequency sufficient to destroy at least one of bacteria, algae and microorganisms.

10. The system of claim 1, wherein the desalination device comprises a heater.

11. The system of claim 1, wherein the desalination device is configured to provide a pressure change to assist desalination.

12. The system of claim 1, further comprising a collection reservoir or a drain.

13. The system of claim 1, further configured to move the liquid in a manner which induces shear forces in the liquid sufficient to enhance removal of precipitated mineral crystals from the liquid that has been treated by said at least one oscillating electric field.

14. The system of claim 1, comprising a plurality of pairs of said electrodes.

15. The system of claim 1, comprising one or more pairs of said electrodes and wherein each of said one or more pairs are positioned on opposite sides of a stream of the liquid.

16. The system of claim 15, comprising at least two pairs of said electrodes.

17. The system of claim 16, wherein two pairs of said electrodes are disposed adjacent to a fluid outlet of said desalination system.

18. The system of claim 1, configured to provide a field strength of 1-10 V/cm.

19. The system of claim 1, wherein the electrodes have an arcuate or semi-circular cross section.

\* \* \* \* \*